(12) United States Patent
Kim et al.

(10) Patent No.: US 7,516,894 B2
(45) Date of Patent: Apr. 14, 2009

(54) LASER DISPLAY APPARATUS

(75) Inventors: Soo-young Kim, Suwon-si (KR); Dong-bum Choi, Suwon-si (KR); Sung-ha Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/588,300

(22) Filed: Oct. 27, 2006

(65) Prior Publication Data

US 2007/0097322 A1   May 3, 2007

(30) Foreign Application Priority Data

Nov. 3, 2005   (KR) .................. 10-2005-0104932

(51) Int. Cl.
*G06K 7/10* (2006.01)
*G06K 7/14* (2006.01)

(52) U.S. Cl. .................. 235/454; 353/30; 353/88

(58) Field of Classification Search ............. 235/454; 359/204, 205, 212, 223, 224, 225, 226; 353/30
See application file for complete search history.

(56) References Cited

U.S. PATENT DOCUMENTS

| | | | | |
|---|---|---|---|---|
| 4,723,248 A | * | 2/1988 | Harter et al. .......... | 372/25 |
| 4,726,248 A | * | 2/1988 | Kawai et al. .......... | 74/471 XY |
| 5,255,082 A | * | 10/1993 | Tamada .................. | 348/750 |
| 5,317,348 A | * | 5/1994 | Knize .................... | 353/31 |
| 5,355,181 A | * | 10/1994 | Ashizaki et al. ....... | 348/744 |
| 2005/0190423 A1 | * | 9/2005 | Sakai .................... | 359/212 |
| 2005/0225882 A1 | * | 10/2005 | Kwok .................... | 359/754 |

FOREIGN PATENT DOCUMENTS

| | | |
|---|---|---|
| JP | 2004-341206 A | 12/2004 |
| KR | 10-1997-0006984 B1 | 5/1997 |
| KR | 10-2001-0011567 A | 2/2001 |
| KR | 1020020036520 | 5/2002 |
| KR | 10-2003-0040820 A | 5/2003 |

* cited by examiner

*Primary Examiner*—Michael G Lee
*Assistant Examiner*—Ali Sharifzada
(74) *Attorney, Agent, or Firm*—Sughrue Mion, PLLC

(57) ABSTRACT

Provided is a laser display apparatus for displaying an image by scanning laser light onto a screen. The laser display apparatus includes: a laser and an optical scanning unit scanning laser light emitted by the laser, whereby an image is provided to the screen; a laser light intensity adjusting unit limiting the intensity of laser light being scanned onto the screen; and a projection lens unit that is disposed between the laser and the screen and enlarges and projects laser light onto the screen.

9 Claims, 5 Drawing Sheets

LASER DISPLAY APPARATUS

CROSS-REFERENCE TO RELATED PATENT APPLICATION

This application claims priority from Korean Patent Application No. 10-2005-0104932, filed on Nov. 3, 2005, in the Korean Intellectual Property Office, the disclosure of which is incorporated herein in its entirety by reference.

BACKGROUND OF THE INVENTION

1. Field of the Invention

The present invention relates to a display apparatus using a laser as a light source, and more particularly, to a laser display apparatus designed to limit the excessive intensity of laser light.

2. Description of the Related Art

A laser display apparatus with excellent directionality allows simple and easy arrangement of optical components. Further, because laser light has higher intensity than that of light emitted from other kinds of light sources, a laser display apparatus provides a large screen having high resolution.

FIG. 1 illustrates an optical arrangement of a conventional laser display apparatus. Referring to FIG. 1, the conventional laser display apparatus includes a laser 11, a condenser lens 13, an acousto-optic modulator (AOM) 15, and an optical scanning unit 20.

The laser 11 continuously emits laser light during driving of the display, which is converged by the condenser lens 13. The AOM 15 is disposed between the condenser lens 13 and the optical scanning unit 20 and controls the transmittance of incident light according to an input image signal so that light corresponding to an image to be displayed on a screen 17 is incident on the optical scanning unit 20. The optical scanning unit 20 includes a rotating polygonal mirror 21 primarily scanning incident light to produce scan lines A, and a galvanometer 25 secondarily scanning the scan lines A produced by the rotating polygonal mirror 21 so that a planar image B can be focused on the screen 17.

The laser display apparatus having the above-described construction can provide high contrast and clear images by using a laser emitting high-intensity light as a light source.

However, because the laser 11 adjusts the amount and intensity of light it emits based on the amount of current being supplied, the intensity of light emitted by the laser 11 may exceed the maximum value of an allowable range when too much current is supplied. Further, when light is incident on a specific region of the screen 17 for more than a predetermined time, the amount and intensity of light may be excessively high. When the amount and intensity of laser light are excessively high, exposing the laser beam directly to human eyes may cause significant damage to the viewer's eyesight.

SUMMARY OF THE INVENTION

An aspect of the present invention provides a laser display apparatus that can prevent excessive intensity of laser light.

According to an aspect of the present invention, there is provided a laser display apparatus for displaying an image by scanning laser light onto a screen including: a laser emitting the laser light; an optical scanning unit scanning light emitted by the laser and providing a planar image to the screen; a laser light intensity adjusting unit limiting the intensity of laser light being scanned onto the screen; and a projection lens unit that is disposed between the laser and the screen and enlarges and projects laser light onto the screen.

The laser light intensity adjusting unit includes an optical limiter that is disposed between the laser and the optical scanning unit and nonlinearly increases the intensity of exit laser light propagating toward the optical scanning unit with increasing intensity of incident laser light emitted by the laser, limits the intensity of the exit laser light when the intensity of the incident laser light exceeds a predetermined value so that exit laser light with intensity not exceeding the predetermined value is incident on the optical scanning unit.

In another exemplary embodiment, the laser light intensity adjusting unit includes: a shutter that is disposed in the propagation path of laser light emitted by the laser and selectively blocks laser light propagating toward the screen; an error detector detecting the malfunction of the optical scanning unit; and a shutter controller controlling the shutter to block the propagation of the laser light emitted by the laser when the error detector determines that the optical scanning unit malfunctions.

In yet another exemplary embodiment, the laser light intensity adjusting unit includes: an error detector detecting the malfunction of the optical scanning unit; and a laser switching controller intercepting a driving power of the laser when the error detector determines that the malfunction of the optical scanning unit occurs.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
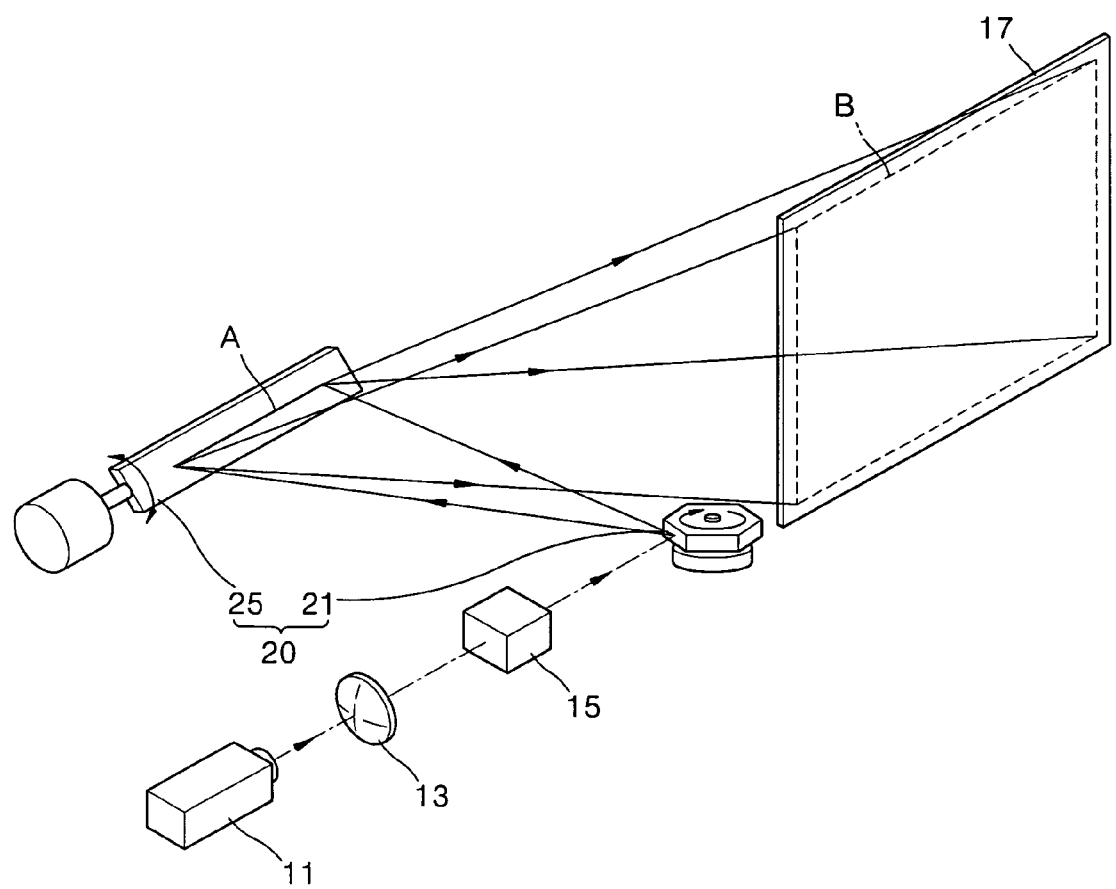
FIG. 1 illustrates an optical arrangement of a conventional laser display apparatus.
Figure 2:
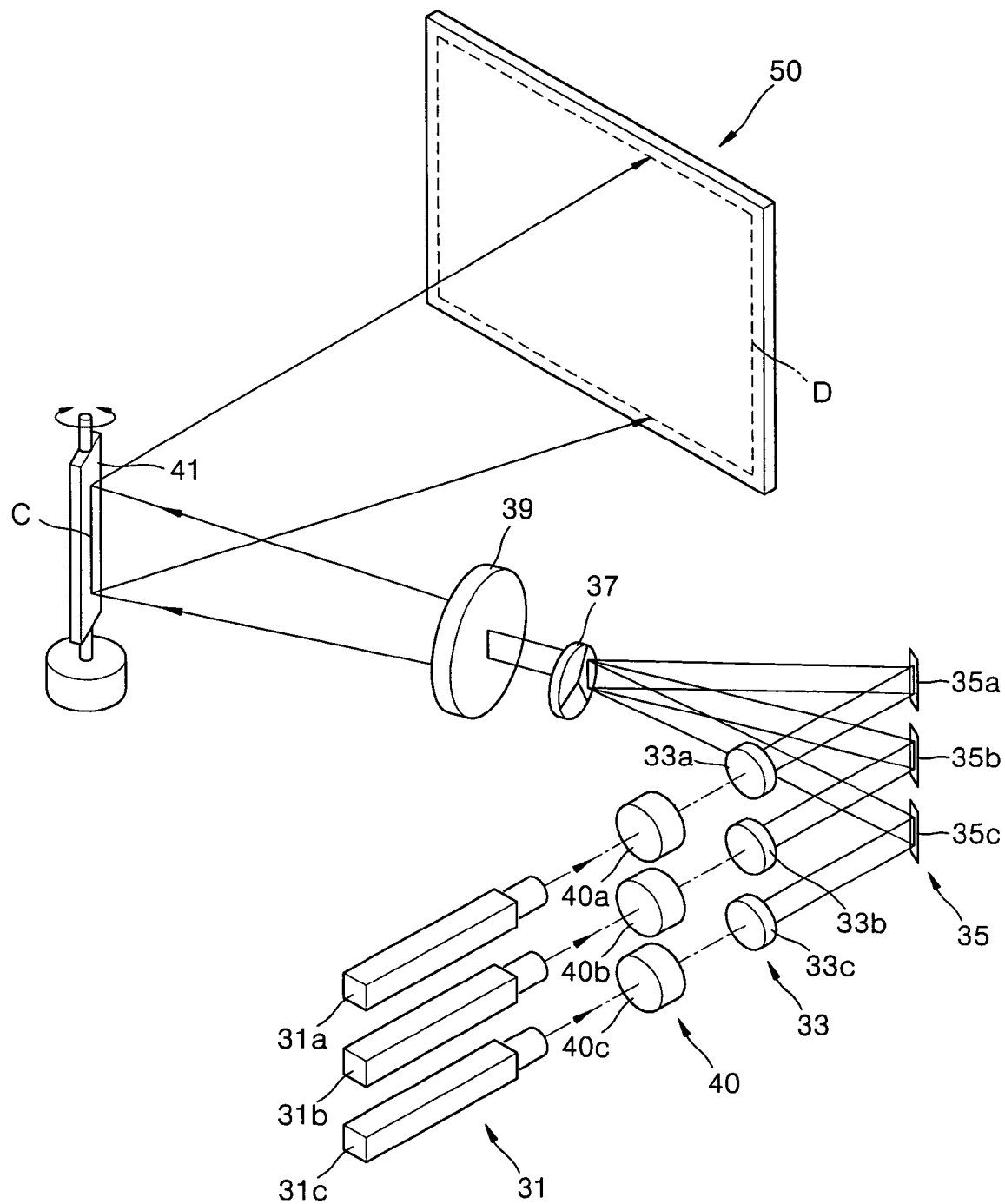
FIG. 2 illustrates an optical arrangement of a laser display apparatus according to an exemplary embodiment of the present invention.

FIG. 2 illustrates an optical arrangement of a laser display apparatus according to an exemplary embodiment of the present invention. Referring to FIG. 2, the laser display apparatus includes a laser 31 emitting laser light of a predetermined wavelength, an optical scanning unit, a light intensity adjusting unit, and a projection lens unit 39 that is disposed between the laser 31 and the screen 50 and enlarges and projects light onto the screen 50.

The laser 31 continuously emits laser light during a driving operation. The laser 31 includes first through third lasers 31a through 31c emitting red, blue, and green laser beams of three different wavelengths, respectively, to implement a color display. Although FIG. 2 illustrates that the first through third lasers 31a through 31c are arranged from top to bottom, they may be arranged in a different order. Further, although in the above description, the first through third lasers 31a through 31c emit red, blue, and green laser beams, the laser 31 may include a different number of lasers emitting other colors.

The optical scanning unit scans light emitted by the laser 31 and provides an image to the screen 50. To achieve this function, the optical scanning unit includes a cylindrical lens 33, a linear reflective panel 35, and a scanning mirror 41.

The cylindrical lens 33 shapes incident light emitted by the laser 31 into light having a linear cross-section. As illustrated in FIG. 2, when the first through third lasers 31a through 31c are used as light sources, the cylindrical lens 33 includes first through third cylindrical lenses 33a through 33c that are disposed in the propagation paths of laser beams emitted by the first through third lasers 31a through 31c and shape the corresponding laser beams.

The linear reflective panel 35 is located between the cylindrical lens 33 and the scanning mirror 41 and independently reflects linear incident light that falls on each pixel to produce a base image. To achieve this, the linear reflective panel 35 is arranged along a line in which linear light is incident and may include a plurality of digital micro-mirror devices corresponding to pixels of the image.

As illustrated in FIG. 2, when the first through third lasers 31a through 31c are used as light sources, the linear reflective panel 35 includes first through third linear reflective panels 35a through 35c disposed in the propagation paths of beams shaped by the first through third cylindrical lenses 33a through 33c In this case, the laser display apparatus further includes a color combining unit 37 that is disposed between the linear reflective panel 35 and the scanning mirror 41 and combines red, blue, and green laser beams emitted by the first through third lasers 31a through 31c and allows beams reflected by the first through third linear reflective panels 35a through 35c to propagate along the same path. To achieve this, the color combining unit 37 includes a color wheel having red, blue, and green color filters, which is rotatably disposed in the optical path. Thus, the red, blue, and green filters are sequentially disposed in the optical path as the color wheel rotates so that the red, blue, and green laser beams sequentially propagate toward the scanning mirror 41.

The scanning mirror 41 reciprocatingly rotates to scan a linearly shaped base image C produced by the linear reflective panel 35 onto the screen 50 and produce an image D.

The light intensity adjusting unit limits the intensity of light being scanned onto the screen 50 when the intensity of light emitted by the laser 31 increases excessively due to factors such as overcurrent.

Figure 3:
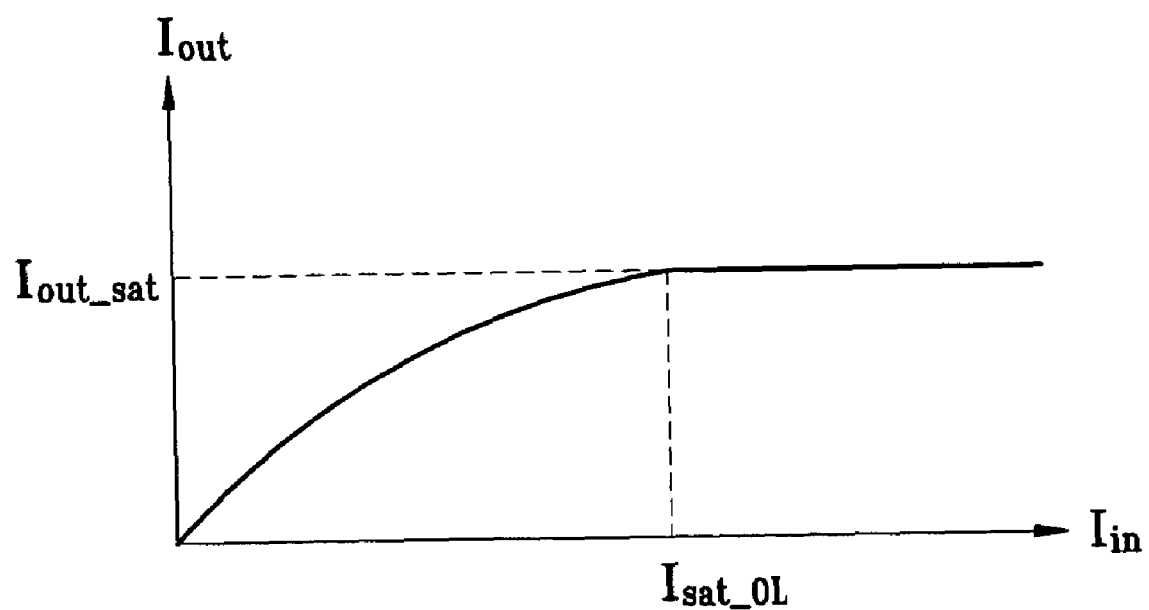
FIG. 3 is a graph illustrating a change in intensity of light irradiated on a screen with respect to the intensity of light emitted by a laser when an optical limiter of the laser display apparatus illustrated in FIG. 2 is used.

To achieve this, the light intensity adjusting unit includes an optical limiter 40 that is disposed between the laser 31 and the linear reflective panel 35. FIG. 3 is a graph illustrating a change in intensity $I_{out}$ of exit light propagating toward the optical scanning unit with respect to the intensity $I_{in}$ of light emitted by the laser 31 when the optical limiter 40 is used. Referring to FIG. 3, the optical limiter 40 non-linearly increases the intensity $I_{out}$ of exit light with increasing intensity $I_{in}$ of incident light. That is, as the intensity $I_{in}$ of incident light increases, the rate of increase in the intensity $I_{out}$ of exit light decreases. When the intensity $I_{out}$ of exit light reaches saturation light intensity $I_{sat\_OL}$ of the optical limiter 40, the intensity $I_{out}$ will not increase any more and remains at the saturation light intensity $I_{sat\_OL}$. Thus, the optical limiter 40 limits the intensity of exit light when the intensity of incident light exceeds a predetermined value so that exit light, with intensity not exceeding the predetermined value, is irradiated toward the optical scanning unit.

Thus, when excessively high laser light is emitted due to a malfunction of a laser, the intensity of exit light is limited to saturation intensity $I_{out\_sat}$ by the optical limiter 40, thereby preventing damage to a viewer's eyesight due to excessively bright laser light.

As illustrated in FIG. 2, when the first through third lasers 31a through 31c are used as light sources, the optical limiter 40 includes first through third optical limiters 40a through 40c disposed in the propagation paths of laser beams emitted by the first through third lasers 31a through 31c, respectively.

Figure 4:
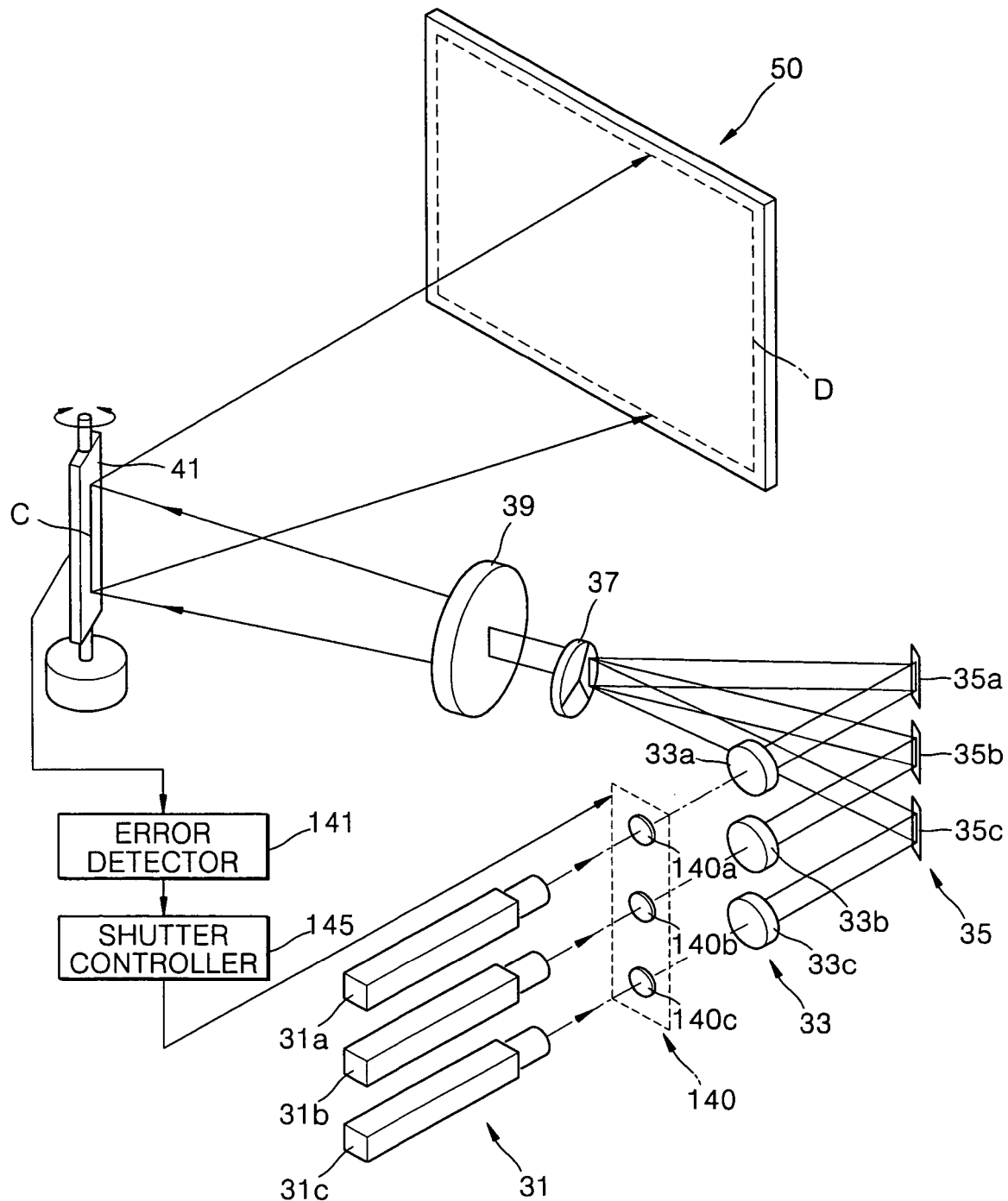
FIG. 4 illustrates an optical arrangement of a laser display apparatus according to another exemplary embodiment of the present invention.

FIG. 4 illustrates an optical arrangement of a laser display apparatus according to another exemplary embodiment of the present invention.

Referring to FIG. 4, the laser display apparatus includes a laser 31, an optical scanning unit, a light intensity adjusting unit, and a projection lens unit 39. Because the laser 31, the optical scanning unit, and the projection lens unit 39 have substantially the same structures and functions as their counterparts in the laser display apparatus of FIG. 2, detailed descriptions thereof will not be provided.

The light intensity adjusting unit prevents excessively high intensity laser light from being incident on a portion of a screen 50 due to a malfunction of the optical scanning unit. To achieve this, the light intensity adjusting unit includes a shutter 140 mechanically blocking laser light, an error detector 141 detecting the malfunction of the optical scanning unit, and a shutter controller 145 controlling the shutter 140. The shutter 140 is disposed in the propagation path of light emitted by the laser 31 and selectively blocks light propagating toward the screen 50.

When the error detector 141 determines that the optical scanning unit malfunctions, the shutter controller 145 allows the shutter 140 to block the light emitted by the laser 31. Conversely, when a scanning mirror 41 operates normally, the shutter controller 145 allows the shutter 140 to open so that light emitted by the laser 31 propagates toward the scanning mirror 41. Thus, the above configuration can prevent abnormally high intensity laser light from being irradiated onto a portion of the screen 50.

As illustrated in FIG. 4, when first through third lasers 31a through 31c are used as light sources, the shutter 140 includes first through third shutters 40a through 40c disposed in the propagation paths of laser beams emitted by the first through third lasers 31a through 31c, respectively.

Figure 5:
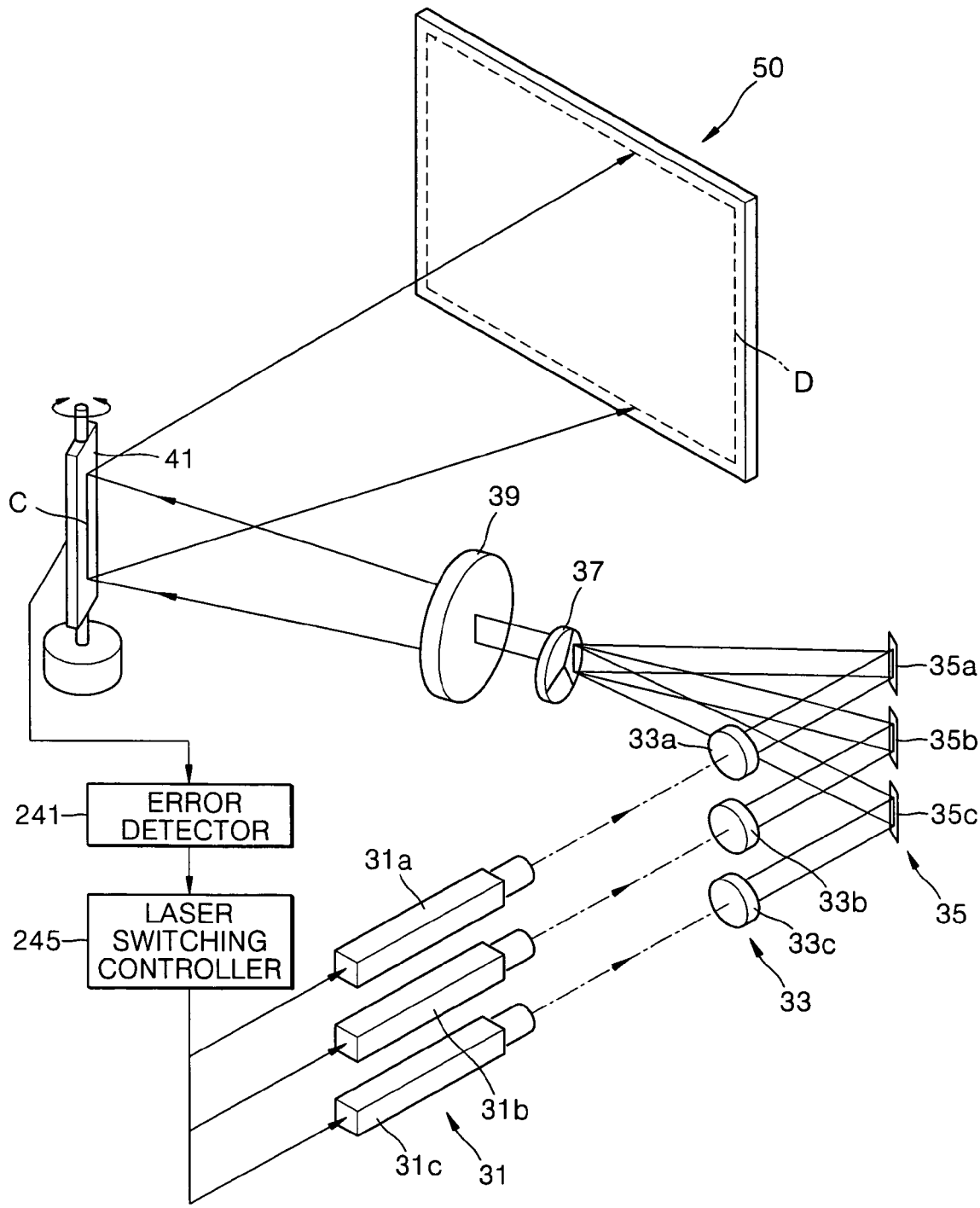
FIG. 5 illustrates an optical arrangement of a laser display apparatus according to another exemplary embodiment of the present invention.

FIG. 5 illustrates an optical arrangement of a laser display apparatus according to another exemplary embodiment of the present invention. Referring to FIG. 5, the laser display apparatus includes a laser 31, an optical scanning unit, a light intensity adjusting unit, and a projection lens unit 39. Because the laser 31, the optical scanning unit, and the projection lens unit 39 have substantially the same structures and functions as their counterparts in the laser display apparatus of FIG. 2, detailed descriptions thereof will not be provided.

The light intensity adjusting unit prevents excessively high intensity laser light from being incident on a portion of a screen 50 due to a malfunction of the optical scanning unit. To achieve this, the light intensity adjusting unit includes an error detector 241 detecting the malfunction of the optical scanning unit and a laser switching controller 245. When the error detector 241 determines that the optical scanning unit malfunctions, the laser switching controller 245 is enabled to prevent irradiation of laser light. Thus, the above configuration can prevent abnormally high intensity laser light from being irradiated onto a portion of the screen 50 due to a malfunction of a scanning mirror 41.

A laser display apparatus configured as described above controls light emitted by a laser through an optical limiter, a shutter, and a laser switching controller, thus preventing excessively high intensity laser light being irradiated onto a screen while ensuring a viewer's safety.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser display apparatus for displaying an image by scanning laser light onto a screen, the apparatus comprising:
   a laser emitting the laser light;
   an optical scanning unit scanning the laser light emitted by the laser and providing a two-dimensional image onto the screen;
   a laser light intensity adjusting unit limiting an excessive intensity of the laser light scanned onto the screen; and
   a projection lens unit disposed between the laser and the screen, wherein the projection lens unit enlarges and projects the laser light onto the screen;
   wherein the laser light intensity adjusting unit comprises an optical limiter disposed between the laser and the optical scanning unit,
   wherein the optical limiter nonlinearly increases an intensity of exit laser light propagating toward the optical scanning unit according to an increasing intensity of incident laser light emitted by the laser, limits the intensity of the exit laser light when the intensity of the incident laser light exceeds a predetermined value so that exit laser light having an intensity not exceeding the predetermined value is incident on the optical scanning unit.

2. The apparatus of claim 1, wherein the laser light intensity adjusting unit comprises:
   a shutter disposed in a propagation path of the laser light emitted by the laser and selectively blocking the laser light propagating toward the screen;
   an error detector detecting a malfunction of the optical scanning unit; and
   a shutter controller which controls the shutter to block the laser light emitted by the laser when the error detector determines that the optical scanning unit malfunctions.

3. The apparatus of claim 1, wherein the laser light intensity adjusting unit comprises:
   an error detector detecting a malfunction of the optical scanning unit; and
   a laser switching controller which turns off the laser when the error detector determines that the optical scanning unit malfunctions.

4. The apparatus of claim 1, wherein the optical scanning unit comprises:
   a cylindrical lens shaping incident laser light emitted by the laser into laser light having a linear cross-section;
   a linear reflective panel independently reflecting the linear incident laser light that falls on each pixel and producing a base image; and
   a scanning mirror scanning the linearly shaped base image produced by the linear reflective panel and producing the image.

5. The apparatus of claim 4, wherein the laser comprises a first laser, a second laser, and a third laser emitting a red color laser light, a blue color laser light, and a green color laser light, respectively;
   wherein the cylindrical lens comprises a first cylindrical lens, a second cylindrical lens, and a third cylindrical lens disposed in propagation paths of the beams emitted by the first laser, the second laser and the third laser, respectively; and
   wherein the linear reflective panel comprises a first reflective panel, a second reflective panel, and a third reflective panel disposed in the propagation paths of the beams shaped by the first cylindrical lens, the second cylindrical lens and the third cylindrical lens, respectively.

6. The apparatus of claim 5, further comprising a color combining unit disposed between the linear reflective panel and the scanning mirror and combining the red color laser light, the blue color laser light, and green color laser light emitted by the first laser, the second laser, and the third laser, respectively, and allows laser light reflected by the first linear reflective panel, the second linear reflective panel, and the third linear reflective panel to propagate along the same path.

7. The apparatus of claim 5, wherein the laser light intensity adjusting unit comprises a first optical limiter, a second optical limiter, and a third optical limiter disposed in the propagation paths of laser light emitted by the first laser, the second laser, and the third laser and nonlinearly increases an intensity of exit laser light propagating toward the optical scanning unit according to an increasing intensity of the incident laser light emitted by the first laser, the second laser, and the third laser and limits an intensity of the exit laser light when the intensity of the incident beams exceeds a predetermined value so that exit laser light having an intensity not exceeding the predetermined value is incident onto the optical scanning unit.

8. The apparatus of claim 5, wherein the laser light intensity adjusting unit comprises:
   a first shutter, a second shutter and a third shutter disposed in the propagation paths of laser light emitted by the first laser, the second laser, and the third laser and selectively blocking laser light propagating toward the screen;
   an error detector detecting a malfunction of the scanning mirror; and
   a shutter controller which controls the first shutter, the second shutter and the third shutter to block laser light emitted by the first laser, the second laser and the third laser, respectively, when the error detector determines that the scanning mirror malfunctions.

9. The apparatus of claim 1, wherein said screen comprises a large screen having high resolution.

* * * * *